United States Patent
Robbins

(10) Patent No.: US 9,403,570 B2
(45) Date of Patent: Aug. 2, 2016

(54) PERSONAL PROTECTION ASSEMBLY

(71) Applicant: Lynn Robbins, Wiggens, MS (US)

(72) Inventor: Lynn Robbins, Wiggens, MS (US)

( * ) Notice: Subject to any disclaimer, the term of this patent is extended or adjusted under 35 U.S.C. 154(b) by 0 days.

(21) Appl. No.: 14/449,329

(22) Filed: Aug. 1, 2014

(65) Prior Publication Data
US 2016/0031509 A1    Feb. 4, 2016

(51) Int. Cl.
*B62J 17/02*    (2006.01)
(52) U.S. Cl.
CPC ..................................... *B62J 17/02* (2013.01)
(58) Field of Classification Search
CPC ................................. B60J 1/04; B61D 25/00
USPC ........................ 296/77.1, 82, 65.03
See application file for complete search history.

(56) References Cited

U.S. PATENT DOCUMENTS

| | | | |
|---|---|---|---|
| 3,704,031 A | 11/1972 | Confer | |
| 4,813,706 A | 3/1989 | Kincheloe | |
| 5,531,478 A | 7/1996 | Houston et al. | |
| 5,794,976 A | 8/1998 | Stevicks | |
| 6,231,104 B1 * | 5/2001 | Roethel | B62J 17/02 296/77.1 |
| 6,786,526 B1 | 9/2004 | Blalock | |
| 7,513,467 B1 | 4/2009 | Hurley | |
| 7,513,545 B2 | 4/2009 | Joseph et al. | |
| 8,308,223 B2 * | 11/2012 | King | B60J 5/0487 112/470.33 |
| 8,439,240 B1 * | 5/2013 | Steiner | G06Q 50/22 224/274 |
| 2006/0049654 A1 * | 3/2006 | Schneidau | B60J 1/20 296/77.1 |
| 2011/0240699 A1 | 10/2011 | Stacy | |

FOREIGN PATENT DOCUMENTS

| | | |
|---|---|---|
| CA | 935474 | 10/1973 |
| CA | 938322 | 12/1973 |
| CA | 2343710 A1 | 8/2001 |
| WO | WO9620852 | 7/1996 |

OTHER PUBLICATIONS

Title: www.atvwebwacker.com Product Name: ATV Web Wacker.

* cited by examiner

*Primary Examiner* — Pinel Romain

(57) ABSTRACT

A personal protection assembly for protecting a user from foreign objects includes a clamp that may be coupled to a vehicle. A mount is movably coupled to the clamp. A pole is selectively coupled to the mount. The pole is retained on the vehicle such that the pole is positioned proximate a driver of the vehicle. A rod is coupled to and extends away from the pole. A wire is coupled to the rod. The wire may capture a foreign object when the vehicle is in motion.

16 Claims, 4 Drawing Sheets

PERSONAL PROTECTION ASSEMBLY

BACKGROUND OF THE DISCLOSURE

Field of the Disclosure

The disclosure relates to personal protection devices and more particularly pertains to a new personal protection device for protecting a user from foreign objects.

SUMMARY OF THE DISCLOSURE

An embodiment of the disclosure meets the needs presented above by generally comprising a clamp that may be coupled to a vehicle. A mount is movably coupled to the clamp. A pole is selectively coupled to the mount. The pole is retained on the vehicle such that the pole is positioned proximate a driver of the vehicle. A rod is coupled to and extends away from the pole. A wire is coupled to the rod. The wire may capture a foreign object when the vehicle is in motion.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
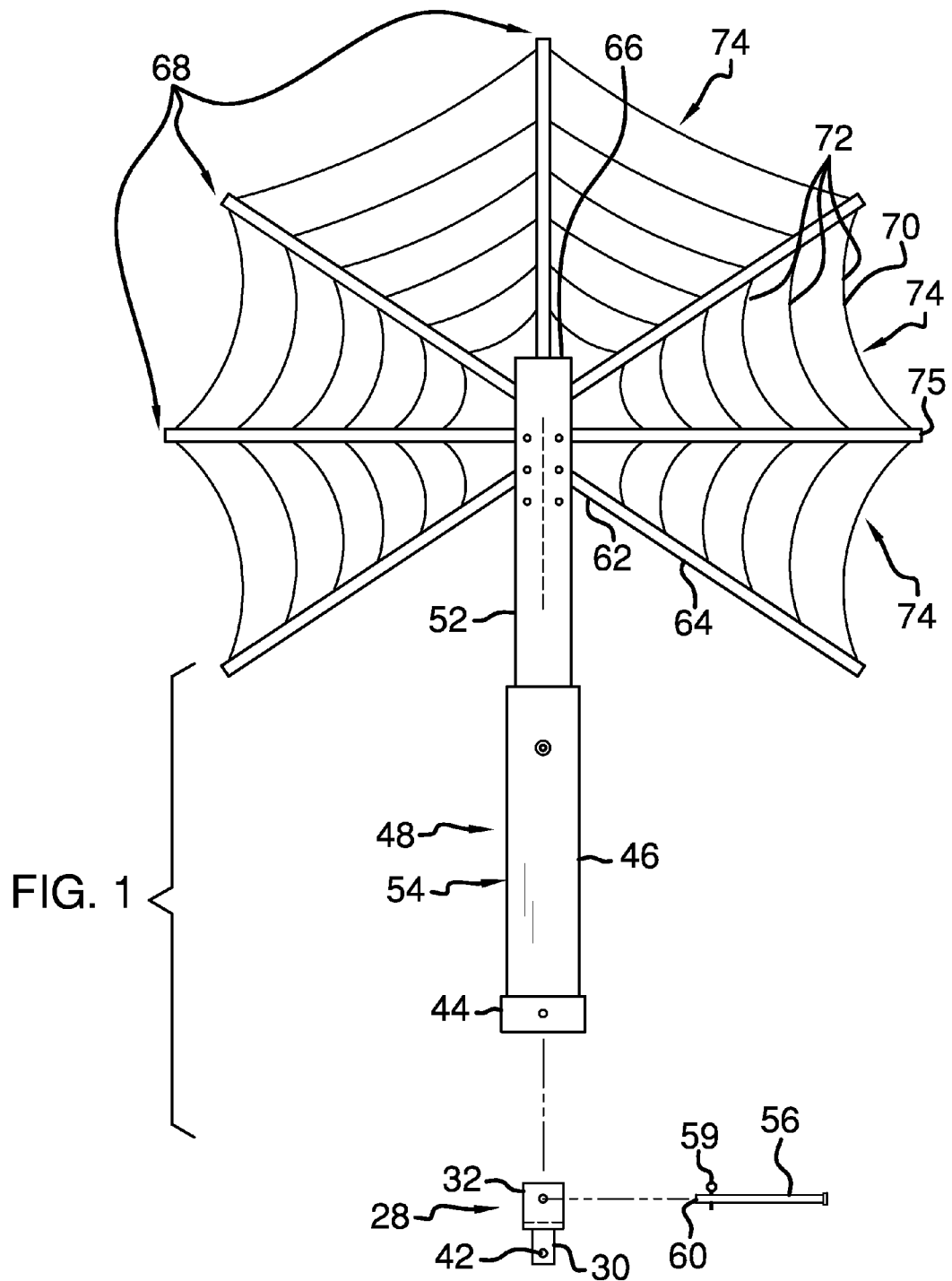
FIG. 1 is a front view of a personal protection assembly according to an embodiment of the disclosure.
Figure 2:
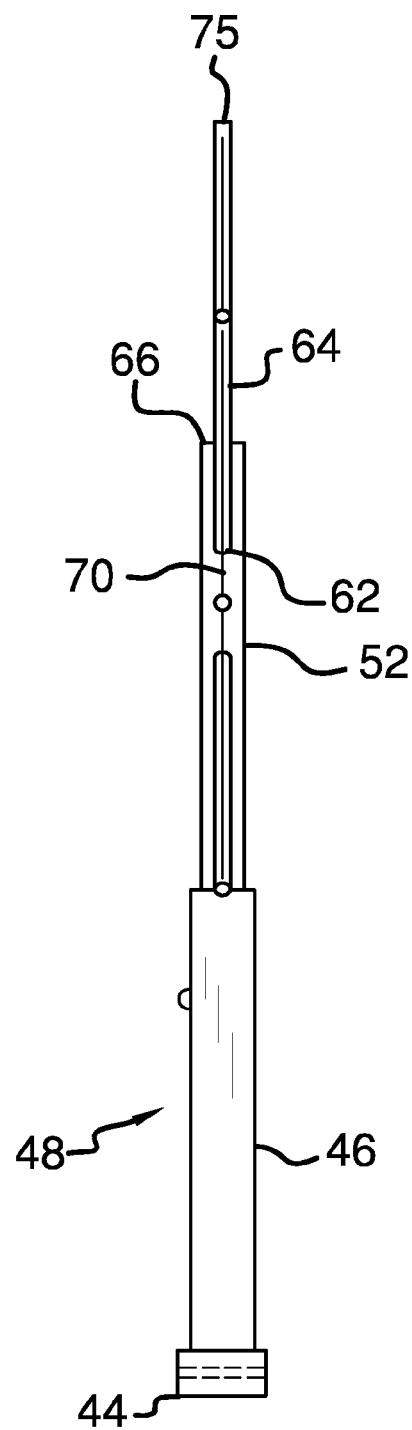
FIG. 2 is a left side view of an embodiment of the disclosure.
Figure 3:
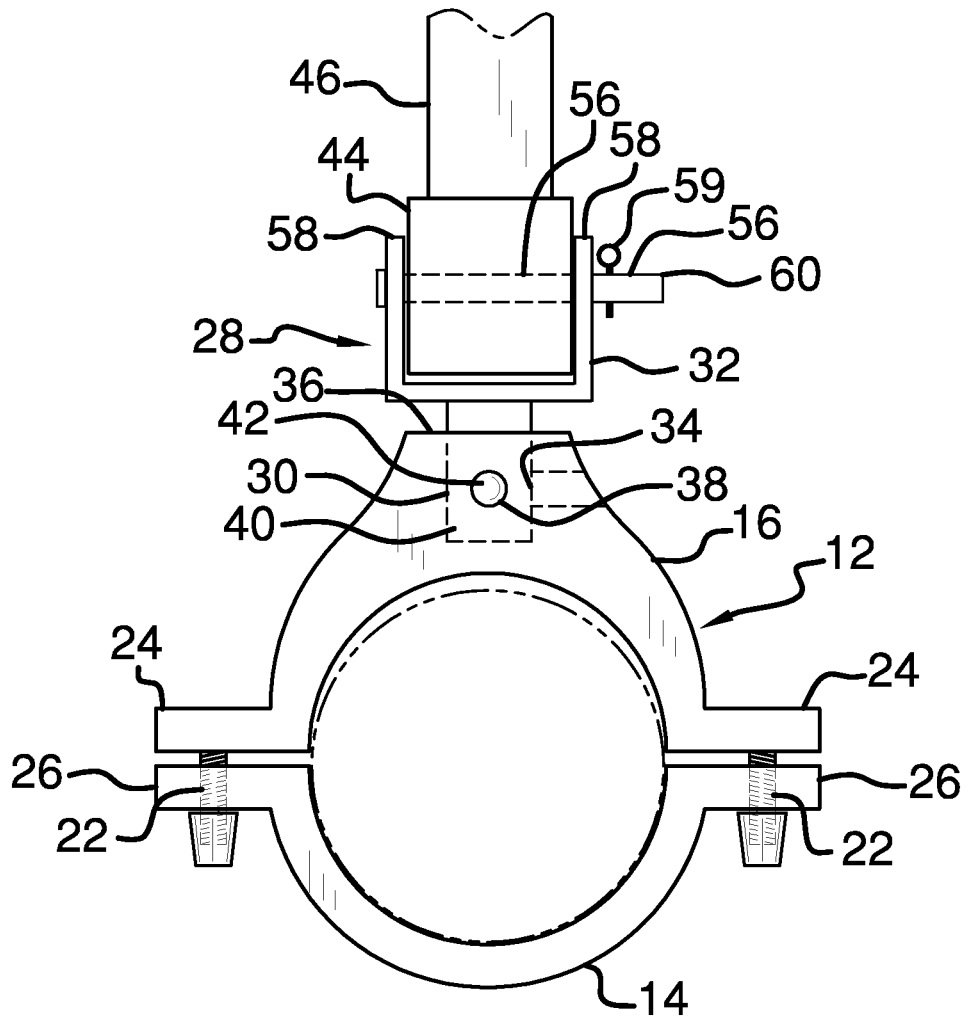
FIG. 3 is a front perspective view of an embodiment of the disclosure.
Figure 4:
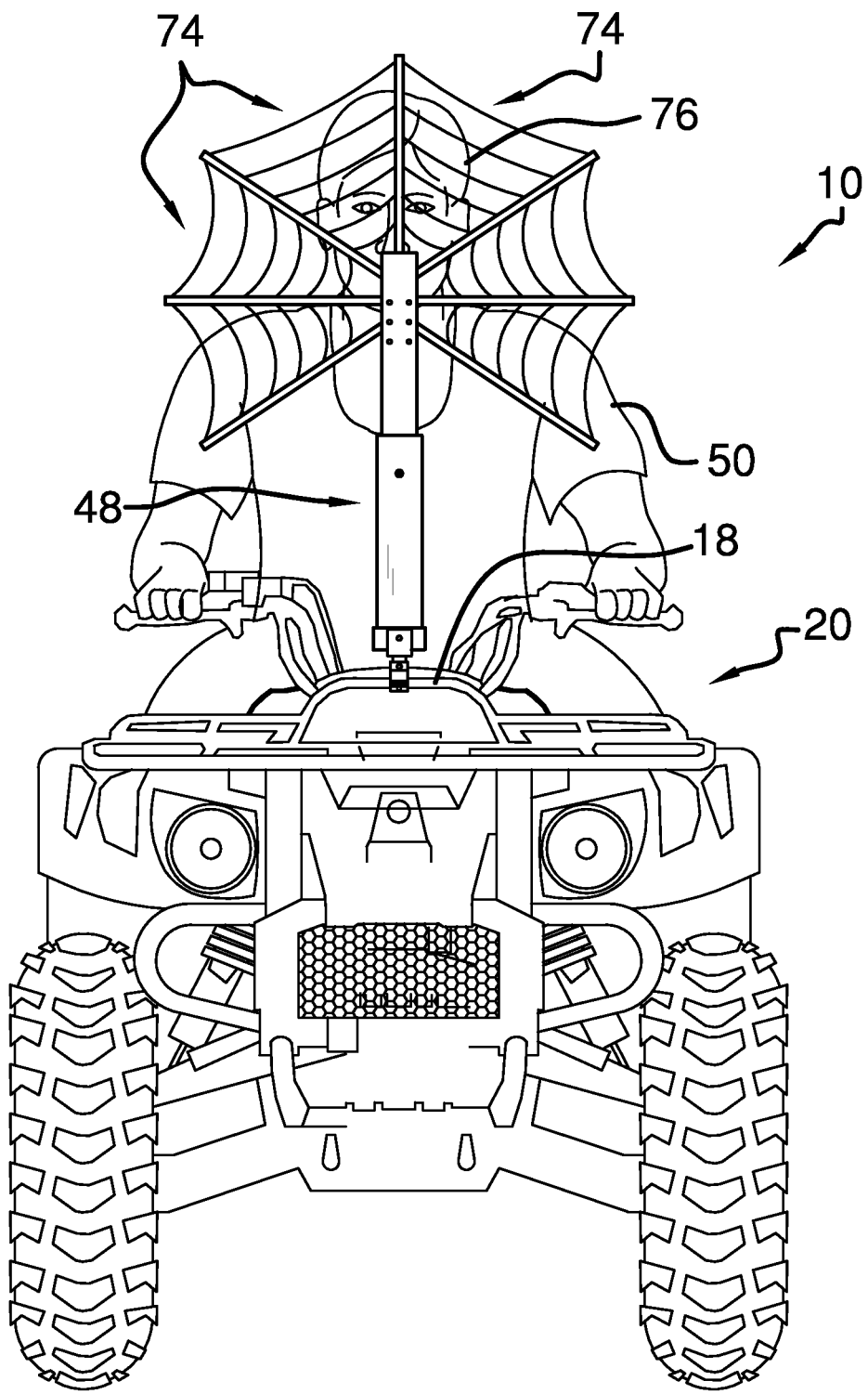
FIG. 4 is an in-use view of an embodiment of the disclosure.

With reference now to the drawings, and in particular to FIGS. 1 through 4 thereof, a new personal protection device embodying the principles and concepts of an embodiment of the disclosure and generally designated by the reference numeral 10 will be described.

As best illustrated in FIGS. 1 through 4, the personal protection assembly 10 generally comprises a clamp 12. An omega shaped bottom portion 14 of the clamp 12 is removably coupled to an omega shaped top portion 16 of the clamp 12. The clamp 12 forms a closed loop. Continuing, each of the omega shaped top 16 and bottom 14 portions of the clamp 12 is positioned around a brushguard 18 on a vehicle 20. Each of the omega shaped top 16 and bottom 14 portions of the clamp 12 may have an inside diameter between 5 cm and 7 cm. Lastly, the vehicle 20 may be an ATV of any conventional design.

A pair of fasteners 22 each extends through an associated pair of ends 24 of the omega shaped top portion 16 of the clamp 12. The pair of fasteners 22 engages an associated pair of ends 26 of the omega shaped bottom portion 14 of the clamp 12. Additionally, the pair of fasteners 22 retains the clamp 12 on the brushguard 18. Lastly, the pair of fasteners 22 may comprise a nut and bolt of any conventional design.

A mount 28 comprises a bottom portion 30 of the mount 28 coupled to and extending downwardly from a U-shaped top portion 32 of the mount 28. The bottom portion 30 of the mount 28 is selectively inserted into a mount well 34 extending downwardly into a flat top side 36 of the omega shaped top portion 16 of the clamp 12. Moreover, the mount 28 is coupled to the clamp 12. A retainer aperture 38 extends through a front side 40 of the omega shaped top portion 16 of the clamp 12. The retainer aperture 38 intersects the mount well 34. A retainer 42 is movably coupled to the bottom portion 30 of the mount 28. The retainer 42 engages the retainer aperture 38 so the mount 28 is retained on the clamp 12.

A bottom end 44 of a bottom portion 46 of a pole 48 is positioned in the U-shaped top portion 32 of the mount 28. The pole 48 is positioned proximate a driver 50 of the vehicle 20. A top portion 52 of the pole 48 is slidably coupled to the bottom portion 46 of the pole 48. The pole 48 has a telescopically adjustable height. Moreover, the bottom portion 46 of the pole 48 may have a height between 15 cm and 20 cm. Additionally, the top portion 52 of the pole 48 may have a height between 15 cm and 20 cm. Lastly, the bottom end 44 of the bottom portion 46 of the pole 48 has a diameter that is greater than a remaining portion 54 of the bottom portion 46 of the pole 48.

A pin 56 extends through each of a pair of vertical arms 58 of the U-shaped top portion 32 of the mount 28. The pin 56 engages the bottom end 44 of the bottom portion 46 of the pole 48 so the pole 48 is retained on the mount 28. A cotter key 59 extends through a first end 60 of the pin 56. The cotter key 59 retains the pin 56 in the U-shaped top portion 32 of the mount 28.

A first end 62 of a rod 64 is coupled to the top portion 52 of the pole 48 proximate a top end 66 of the top portion 52 of the pole 48. The rod 64 extends laterally away from the top portion 52 of the pole 48. Moreover, the rod 64 may have a length between 30 cm and 60 cm. The rod 64 is one of a plurality of the rods 68. Each of the plurality of rods 68 is oriented at an acute angle with respect to an adjacent one of the plurality of rods 68. Lastly, the plurality of rods 68 radiates outwardly from the top end 66 of the top portion 52 of the pole 48.

A wire 70 is coupled between an associated pair of the plurality of rods 68. The wire 70 is one of a plurality of the wires 72. Moreover, the plurality of wires 72 is evenly distributed between the first end 62 and a second end 75 of the associated pair of the plurality of rods 68. Each of the plurality of wires 72 has a successively decreasing length between the first 62 and second 74 ends of the rod 68.

The plurality of wires 72 comprises a plurality of sets of the wires 74. Moreover, the plurality of sets of wires 74 is evenly distributed between the plurality of rods 68. The plurality of sets of wires 74 forms a spider web-like shape. Additionally, the plurality of sets of wires 74 may capture a foreign object when the vehicle 20 is in motion. The foreign object may be a spider web.

In use, the assembly 10 is coupled to the vehicle 20 when the vehicle 20 is to be operated in an undeveloped area. Additionally, the plurality of sets of wires 74 is positioned in front of the driver's face 76 so the foreign object does not contact the driver's face 76. The pole 48 is positionable in the mount 28 so the pole extends laterally away from the mount rather than extending upwardly from the mount 28. The pole 48 is extended laterally away from the mount 28 so the pole 48 and the plurality of rods 68 are not positioned in front of the driver's face 76. The pole 48 and mount 28 may be removed from the clamp 12 at any time. Additionally, the clamp 12 is left coupled to the brushguard 18 after the pole 48 and mount 28 are removed from the clamp 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A personal protection assembly for protecting a user from foreign objects while operating a vehicle, said assembly comprising:
    a clamp configured to be coupled to the vehicle;
    a mount movably coupled to said clamp;
    a pole selectively coupled to said mount wherein said pole is retained on the vehicle such that said pole is positioned proximate a driver of the vehicle;
    a rod coupled to and extending away from said pole, said rod being one of a plurality of said rods; and
    a wire coupled to said rods wherein said wire is configured to capture the foreign object when the vehicle is in motion.

2. The assembly according to claim 1 further comprising said clamp comprising an omega shaped bottom portion of said clamp removably coupled to an omega shaped top portion of said clamp wherein said clamp forms a closed loop.

3. The assembly according to claim 2 further comprising each of said omega shaped top and bottom portions of said clamp being positioned around a brushguard on the vehicle wherein said clamp is positioned on the brushguard.

4. The assembly according to claim 1 further comprising a pair of fasteners each extending through an omega shaped top portion of said clamp and engaging an omega shaped bottom portion of said clamp wherein said clamp is retained on a brushguard.

5. A personal protection assembly for protecting a user from foreign objects while operating a vehicle, said assembly comprising:
    a clamp configured to be coupled to the vehicle;
    a mount movably coupled to said clamp;
    a pole selectively coupled to said mount wherein said pole is retained on the vehicle such that said pole is positioned proximate a driver of the vehicle;
    a rod coupled to and extending away from said pole;
    a wire coupled to said rod wherein said wire is configured to capture the foreign object when the vehicle is in motion; and
    said mount comprising a bottom portion of said mount coupled to and extending downwardly from a U-shaped top portion of said mount.

6. The assembly according to claim 5 further comprising said bottom portion of said mount being selectively inserted into a mount well extending downwardly into a top flat side of a omega shaped top portion of said clamp wherein said mount is coupled to said clamp.

7. The assembly according to claim 5 further comprising a bottom end of a bottom portion of said pole being positioned in said U-shaped top portion of said mount.

8. The assembly according to claim 5 further comprising a pin extending through each of a pair of vertical arms of said U-shaped top portion of said mount and engaging a bottom end of a bottom portion of said pole wherein said pole is retained on said mount.

9. The assembly according to claim 1 further comprising a top portion of said pole being slidably coupled to a bottom portion of said pole wherein said pole has a telescopically adjustable height.

10. The assembly according to claim 1 further comprising a first end of said rod being coupled to a top portion of said pole proximate a top end of said top portion of said pole wherein said rod extends laterally away from said top portion of said pole.

11. The assembly according to claim 1 further comprising each of said plurality of rods being oriented at an acute angle with respect to an adjacent one of said plurality of rods wherein said plurality of rods radiates outwardly from a top end of a top portion of said pole.

12. The assembly according to claim 1 further comprising said wire being coupled between an associated pair of a plurality of rods.

13. The assembly according to claim 1 further comprising said wire being one of a plurality of said wires being evenly distributed between a first end and a second end of an associated pair of a plurality of rods.

14. The assembly according to claim 13 further comprising said plurality of wires comprising a plurality of sets of said wires.

15. The assembly according to claim 14 further comprising said plurality of sets of wires being evenly distributed between a plurality of rods wherein said plurality of sets of wires forms a spider web-like shape.

16. A personal protection assembly for protecting a user from foreign objects while operating a vehicle, said assembly comprising:
    a clamp comprising an omega shaped bottom portion of said clamp removably coupled to an omega shaped top portion of said clamp wherein said clamp forms a closed loop, each of said omega shaped top and bottom portions of said clamp being positioned around a brushguard on the vehicle;
    a pair of fasteners each extending through said omega shaped top portion of said clamp and engaging said omega shaped bottom portion of said clamp wherein said clamp is retained on the brushguard;
    a mount comprising a bottom portion of said mount coupled to and extending downwardly from a U-shaped top portion of said mount, said bottom portion of said mount being selectively inserted into a mount well extending downwardly into a top flat side of said omega shaped top portion of said clamp wherein said mount is coupled to said clamp;
    a bottom end of a bottom portion of a pole being positioned in said U-shaped top portion of said mount such that said pole is positioned proximate a driver of the vehicle, a top portion of said pole being slidably coupled to said bottom portion of said pole wherein said pole has a telescopically adjustable height;

a pin extending through each of a pair of vertical arms of said U-shaped top portion of said mount and engaging said bottom end of said bottom portion of said pole wherein said pole is retained on said mount;

a first end of a rod being coupled to said top portion of said pole proximate a top end of said top portion of said pole wherein said rod extends laterally away from said top portion of said pole, said rod being one of a plurality of said rods;

each of said plurality of rods being oriented at an acute angle with respect to an adjacent one of said plurality of rods wherein said plurality of rods radiates outwardly from said top end of said top portion of said pole;

a wire coupled between an associated pair of said plurality of rods, said wire being one of a plurality of said wires being evenly distributed between said first end and a second end of said associated pair of said plurality of rods; and said plurality of wires comprising a plurality of sets of said wires, said plurality of sets of wires being evenly distributed between said plurality of rods wherein said plurality of sets of wires forms a spider web-like shape wherein said plurality of sets of wires is configured to capture the foreign object when the vehicle is in motion.

* * * * *